Figure 2:
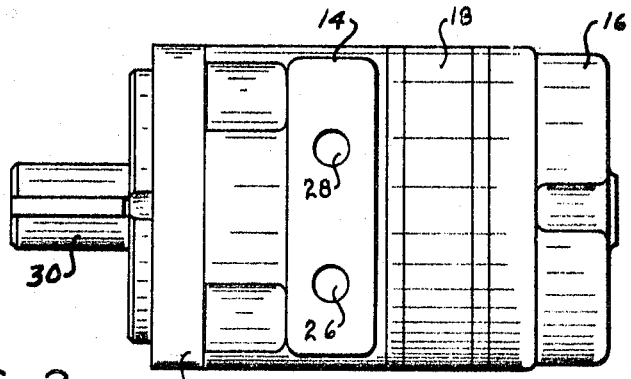

July 22, 1969     R. T. EDDY     3,456,559

ROTARY DEVICE

Filed July 21, 1967     3 Sheets-Sheet 1

INVENTOR.
ROBERT T. EDDY
BY M. A. Hobbs
ATTORNEY

July 22, 1969

R. T. EDDY 3,456,559

ROTARY DEVICE

Filed July 21, 1967

3 Sheets-Sheet 2

INVENTOR.
ROBERT T. EDDY
BY *M. A. Hobbs*
ATTORNEY

July 22, 1969     R. T. EDDY     3,456,559
ROTARY DEVICE

Filed July 21, 1967     3 Sheets-Sheet 3

INVENTOR.
ROBERT T. EDDY
BY
ATTORNEY

United States Patent Office 3,456,559
Patented July 22, 1969

3,456,559
ROTARY DEVICE
Robert T. Eddy, South Bend, Ind., assignor to The Reliance Electric and Engineering Company, a corporation of Ohio
Filed July 21, 1967, Ser. No. 655,036
Int. Cl. F01c 1/10, 11/00; F04c 1/06
U.S. Cl. 91—56                                  12 Claims

---

A motor or pump device having an outer stationary gerotor element with internal teeth, an orbiting gerotor element disposed within the outer gerotor element and having external teeth, and a porting system in which the orbiting gerotor element having passages therein forms part of the system to control the fluid between inlet and outlet fluid passages. The passages in the gerotor element may be a plurality of equally spaced, generally radially extending slots on one side of the element, which communicate with ports in the housing side wall adjacent the orbiting element.

---

Hydraulic motors and pumps utilizing inner and outer gerotor elements are extensively used in a variety of hydraulic systems, and in recent years the gerotor principle has been extensively used in motors and pumps in which the outer gerotor element is stationary and the inner gerotor element, normally having one less tooth than the outer element, is orbited within the outer element in meshing relation therewith. The inner orbiting element is connected by a universal joint to a rotating shaft serving as a force output or input member, depending upon whether the unit is being used as a motor or a pump. Inlet and outlet ports for the hydraulic fluid are synchronized with the expanding and contracting chambers between the lobes on the two gerotor elements by a rotary valve structure operated in accordance with the speed of the aforementioned shaft. The usual type of motor embodying the orbital principle, while having high torque output and high volumetric efficiency at low speeds, contains a valving structure and universal drive interconnecting the inner element with the output shaft of relatively complicated construction which is costly to manufacture and which lacks the necessary or desired compactness for an efficient, effective and economical motor. Pumps involving the same valving arrangement and universal joint structure have the same inherent disadvantages as those present in motors of this type, along with the presence of a pulsating component in the delivery of fluid from the pump. Further, motors and pumps have been developed utilizing a port plate which rotates at the same speed as the movable gerotor element orbits, and hence is driven at speeds many times the speed of the motor output shaft or the pump input shaft. This creates operational problems, including a relatively short optimum performance life of the port plate and of the parts associated therewith. It is therefore one of the principal objects of the present invention to provide a hydraulic motor or pump having an orbiting gerotor element and a port system in combination therewith which involves a single fixed port plate and a porting arrangement movable with the orbiting element, and in which there is a smooth, non-pulsating flow of fluid involving no complicated valving or fluid flow systems.

Another object of the invention is to provide a relatively simple orbital type gerotor motor or pump having a relatively simple and compact porting system which can readily be machined in the various motor or pump parts and which is fully contained in the main motor pump body.

A further object is to provide a motor or pump structure of the aforesaid type in which an inner non-orbiting gerotor element is meshed in driving or driven relation with an orbiting intermediate element meshed in driving or driven relation with the outer gerotor element, and in which the intermediate element contains porting forming output or intake ports operating in conjunction with a fixed port plate in the motor or pump body.

Another object is to provide a compound or multiple-stage motor or pump of the gerotor type in which the one gerotor element is common to more than one operating stage or motor-pump unit and forms a principal part of the fluid inlet and outlet porting system.

Figure 1:
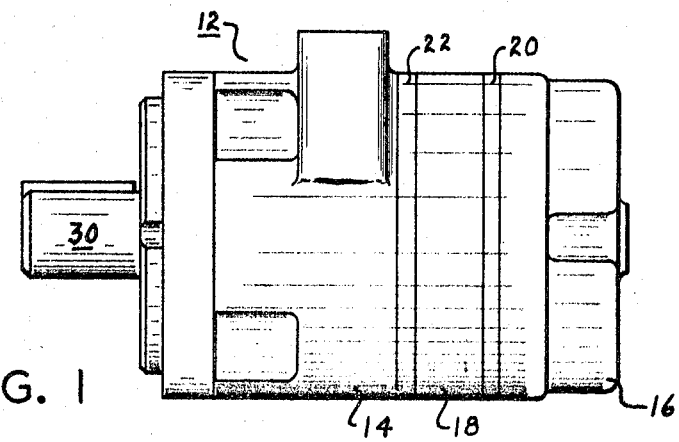
Figures 3, 4:
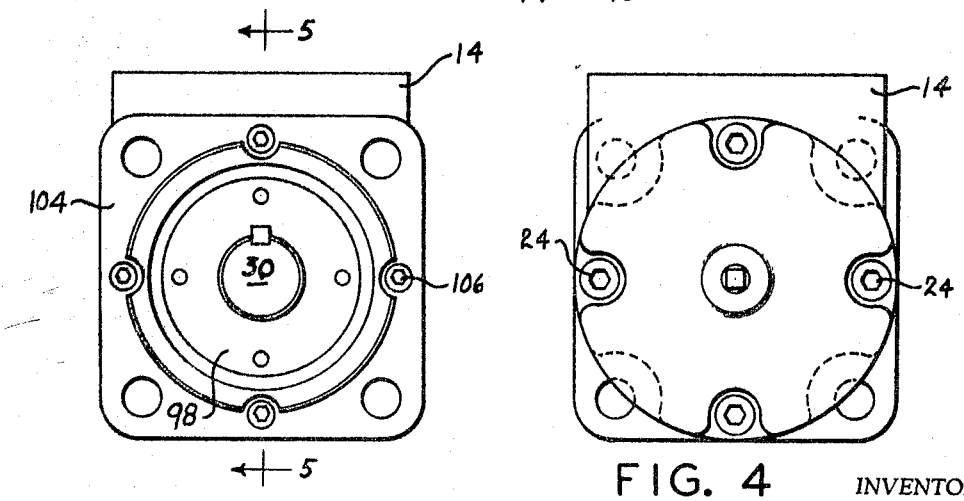
Figure 5:
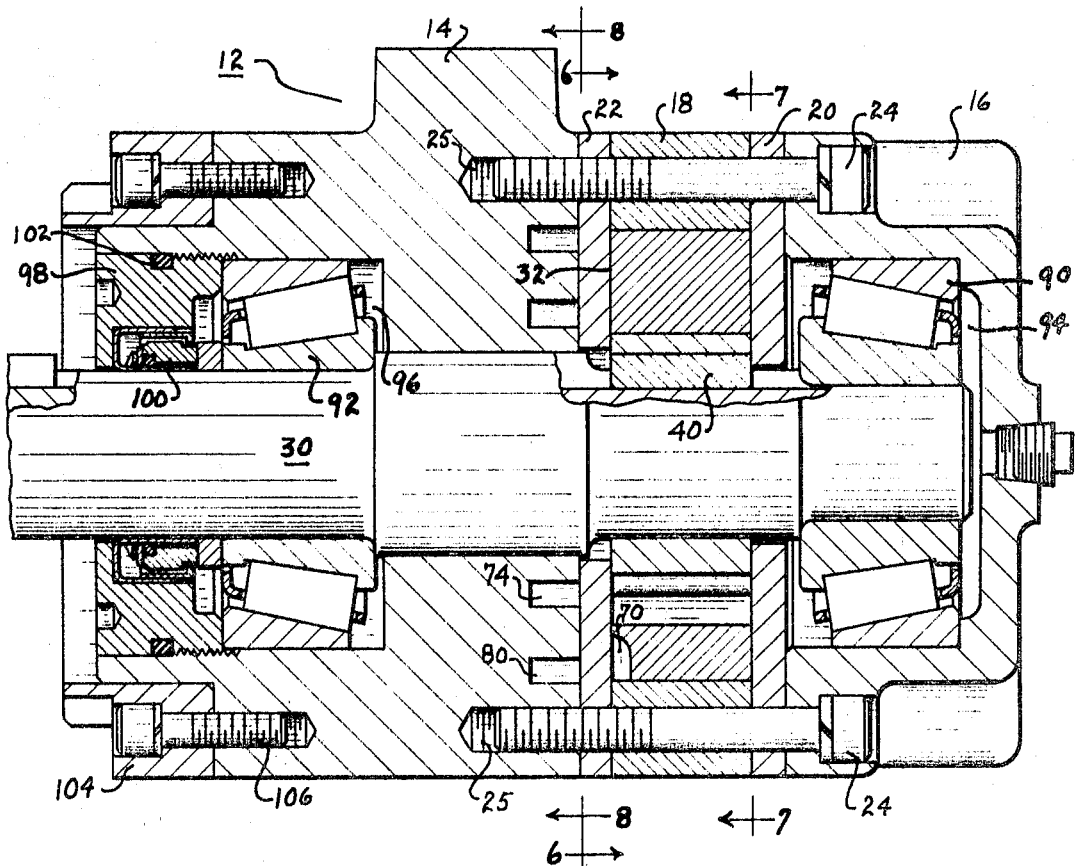
Figure 6:
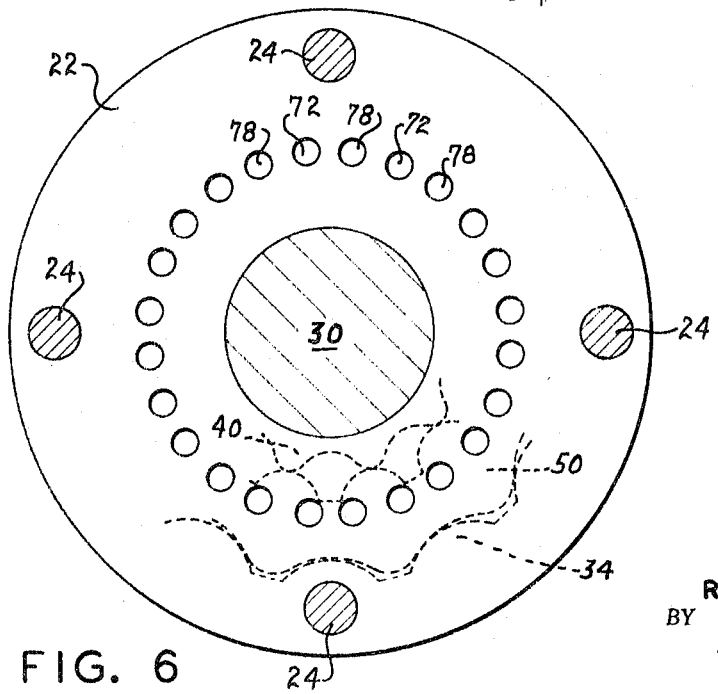
Figure 7:
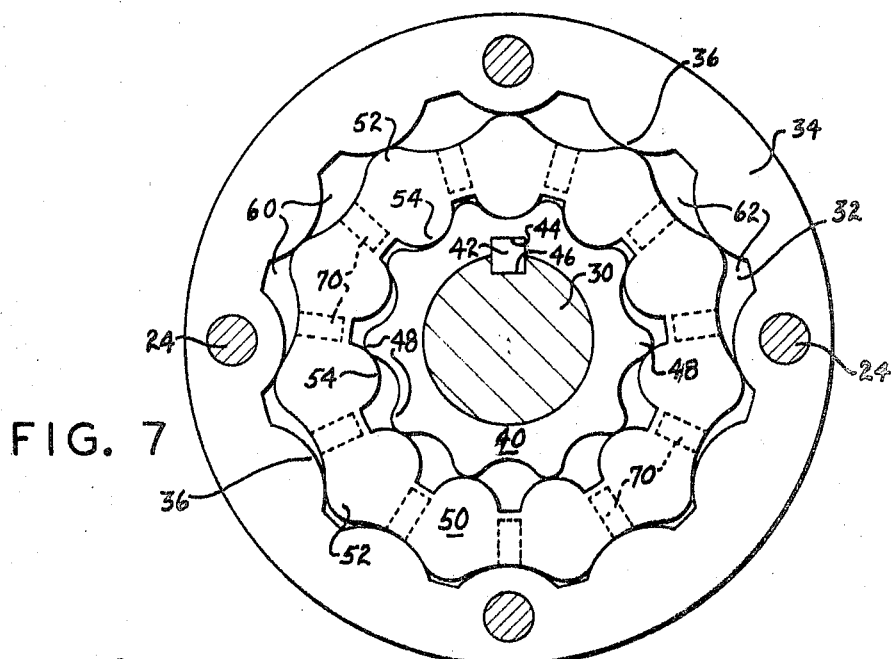
Figure 8:
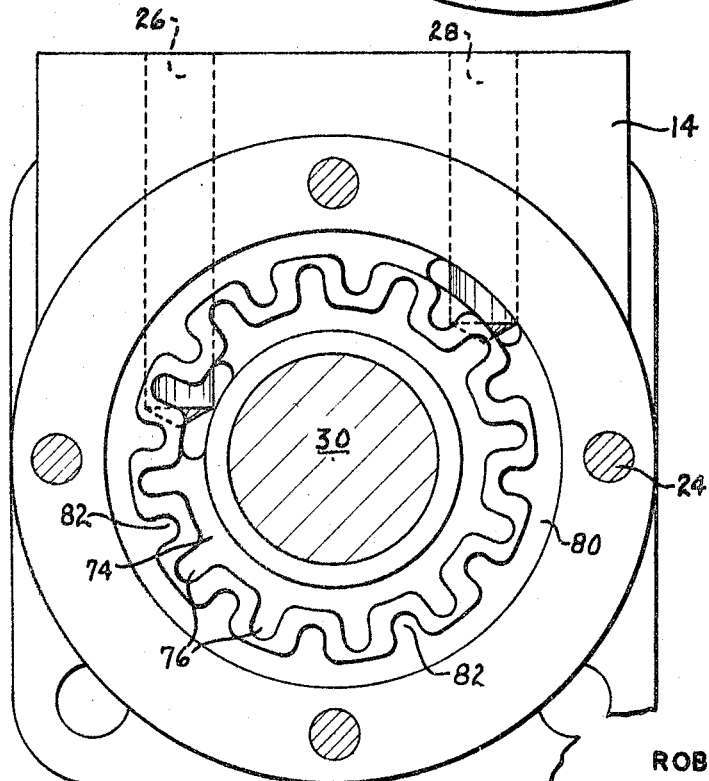

Additional objects and advantages of the invention will become apparent from the following description and accompanying drawings, wherein:

FIGURE 1 is a side elevational view of the present motor or pump device;
FIGURE 2 is a top plan view of the present device;
FIGURES 3 and 4 are opposite end views of the device;
FIGURE 5 is a vertical cross-sectional view taken on line 5—5 of FIGURE 3;
FIGURE 6 is a vertical cross-sectional view taken on line 6—6 of FIGURE 5;
FIGURE 7 is a vertical cross-sectional view taken on line 7—7 of FIGURE 5; and
FIGURE 8 is a cross-sectional view taken on line 8—8 of FIGURE 5.

Referring more specifically to the drawings, a motor or pump is shown having a housing designated generally by numeral 12, consisting of outer sections 14 and 16 and an intermediate section 18, spacer plate 20 and port plate 22 interposed between the two outer sections and held firmly therebetween by a plurality of screws 24 extending through bores in the outer section 16 and through the intermediate section and the two plates into threaded bores 25 in outer section 14, the screws retaining the three sections and two plates firmly together to form a unitary structure. The present hydraulic structure has a wide variety of applications and may be used equally as well for a motor or a pump, without alteration of the internal structure thereof. For convenience of the description, the structure will be described with reference to its use as a hydraulic motor having fluid ports 26 and 28 in housing section 14, and, again for convenience of the description, port 26 will be referred to as the inlet port and port 28 as the outlet port of the motor. These ports can be reversed with respect to the inlet and outlet functions, and in so doing, reverse the direction of rotation of the motor output shaft 30. In the event the device is used as a pump, fluid ports 26 and 28 will be either fluid inlet or outlet, depending on the direction shaft 30 is driven. The motor may be used to drive a variety of different machines and apparatus, either by direct drive from shaft 30, or from the shaft through gears, sprockets and chain, or pulleys and belt. While the present mechanism is designed primarily for use with hydraulic fluids, it may be used in connection with other types of fluid, including water, fuel and lubricating oil, these various uses and adaptations being considered within the scope of the present invention.

The pump housing section 18 contains a chamber 32 in which is disposed an internally toothed gerotor element 34 having twelve teeth 36 defining the external wall of the pumping chamber 32. In the embodiment shown, element 34 is formed integrally with the external wall of section 18 and is held securely in fixed position in chamber 32 concentrically with shaft 30. Mounted on shaft 30 is an inner gerotor element 40 secured to the shaft for rotation therewith by a key 42 in keyways 44 and 46 in the inner element 40 and shaft 30, respectively, and having ten external teeth 48. Interposed between outer element 34 and inner element 40 is an intermediate gerotor element 50 having eleven teeth 52 on its outer periphery, and the same number of teeth 54 on its inner periphery. The number of teeth 52 on the outer periphery on element 50 is one less than the number of internal teeth 36 on element 34. Likewise, the number of teeth on the inner periphery of element 50 is one more than the number of external teeth on inner element 40. During the operation of the motor, the intermediate gerotor element orbits between the outer and inner gerotor elements in response to the fluid pressure differential between the inlet and outlet passages and, as the intermediate element orbits, it drives inner element 40 and shaft 30 through the interengagement of teeth 54 and 48 on the respective elements. During each orbital cycle of intermediate element 50, cavities 60, consisting of one half of the cavities defined by the internal periphery of element 34 and the external periphery of intermediate element 50, are expanding, cavities 62, consisting of the remaining cavities between the two elements, are contracting, thus producing a driving action as the expanding cavities 60 receive the fluid under pressure from the inlet passage and the contracting cavities 62 release the fluid to the outlet passage.

In the gerotor element arrangement just described, chambers 60 and 62 expand and contract around the internal periphery of element 34 as element 50 orbits within element 34. The expanding chambers are connected with inlet passage 26 by radial slots 70 in one side of intermediate element 50, ports 72 disposed in fixed port plate 22, and spaced in a circle concentric with shaft 30, and annular passage 74 in housing section 14. Passage 74 is provided with inward extensions 76 communicating directly with ports 72 in plate 22. The contracting chambers between the outer and intermediate elements are connected to outlet passage 28 by radial slots 70, ports 78 spaced in a circle concentric with shaft 30, and an annular passage 80 having outward extensions 82 communicating directly with holes 78. Annular passages 74 and 80 communicate directly with passages 26 and 28, respectively. As the intermediate gerotor element 50 orbits, the expanding chambers 60 and contracting chambers 62 likewise orbit, and passages 70 progressively communicate alternately with holes 72 and 78, thus providing constant communication between inlet port 26 and the expanding chambers 60 and outlet port 28 and the contracting chambers 62. The width and shape of slots 70 may be varied in relation to ports 72 and 78 to obtain various operating characteristics and optimum performance of the inlet and outlet porting systems, the configuration shown in the drawings being merely a straight rectangular cross-sectional configuration, in which the outer end communicates directly with the chambers 60 and 62, and the open side portions of each slot communicate directly but alternately between adjacent ports 72 and 78. One of the particular advantages of the present porting system is the absence of any moving parts which are otherwise not performing some independent action or operation. The port plate 22 is stationary and communicates with the stationary annular passages in housing section 14. The constant communication between the expanding chambers and the inlet passage and the contracting chambers and the outlet passage is performed solely by the orbital movement of the intermediate gerotor element as it performs its normal force-transmitting function to or from inner gerotor element 40 and shaft 30. When the present unit is used as a pump, the operation of the motor is reversed, and the force from shaft 30, which is then the input shaft, is transmitted through element 40 to intermediate gerotor element 50, causing the latter element to orbit, and while it orbits, creates expanding pumping chambers 60 and contracting pumping chambers 62, which constantly communicate with inlet passage 26 and outlet passage 28 through radial slots 70 and ports 72 and 78, and annular passages 74 and 80, respectively. Various changes may be made in the porting system, such as the use of drilled holes in element 50 connecting the expanding and contracting chambers 60 and 62 with the respective ports 72 and 78 in the port plate 22, and/or varying the shape of a portion of teeth 52 or the interconnecting portion thereof in element 50.

Shaft 30 is journalled at one end in roller bearing 90 and at the other end in roller bearing 92, the two bearings being disposed in chambers 94 and 96, respectively, the former being sealed and fully enclosed in housing section 16, and the latter being closed by a retainer 98 threadedly received in the end of chamber 96, the retainer having seals 100 and 102 in the internal and external walls thereof. When the unit is used as a motor, the shaft is connected to equipment to be driven thereby by an adapter 104, or other suitable means may be provided for rigidly mounting the motor on the equipment, and as shown in the drawings, the adapter is secured to housing section 14 by a plurality of screws 106.

In the operation of the present device as a motor, with fluid passage 26 being the inlet passage and passage 28 the outlet passage, fluid under pressure from a pump flows through annular passage 74, and approximately one half of extensions 76, thence through slots 70 into the expanding fluid passages 60, thereby causing the inner gerotor element to orbit in a clockwise direction as viewed in FIGURE 7. The orbital movement of gerotor element 50 is transmitted by teeth 54 to teeth 48 of gerotor element 40, which in turn transmits the force to output shaft 30. As element 50 orbits, slots 70 move progressively from intake ports 72 to outlet ports 78 as the respective spaces between teeth 52 shift between expanding and contracting chamber function. The size and shape of slots 70 and the relationship of the slots to ports 72 and 78 are such that the transition of the spaces between the outer element 34 and intermediate element 50, from inlet chambers 60 to outlet chambers 62, is substantially instantaneous, without any significant interruption in communication of slots 70 which either the inlet or outlet ports 72 or 78. The fluid leaving the contracting chambers 62 passes through ports 78 and annular passage 80 to outlet passage 28, which is connected to a reservoir or return line to a fluid pressure pump.

When the device is to be used as a pump, the shaft 30 is driven, for example in a clockwise direction as viewed in FIGURE 7, and inner gerotor element 40 imparts an orbital movement to element 50, thereby expanding chambers 60 and contracting chambers 62, which orbit along with the intermediate element. As element 50 moves through its orbital cycle, slots 70 communicate with inlet ports 72 of port plate 22, which in turn communicate with annular passage 74 and inlet passage 26, and alternately communicate with ports 78 which in turn communicate with annular passage 80 and outlet passage 28. The communication of the slots 70 with ports 72 and ports 78 is synchronized with the expanding and contracting chambers 60 and 62 respectively, which orbit as element 50 orbits, thus constantly maintaining the expanding chambers in communication with the pressurized fluid, and the contracting chambers in communication with the fluid return line.

In the embodiment of the invention illustrated in the drawings, the inner gerotor element 40 merely transmits the force between the intermediate gerotor element 50 and shaft 30, and this concept is covered by my copending application Ser. No. 636,126, filed May 4, 1967; however, as disclosed in the prior application, the inner gerotor element may form a compound motor or pump with the intermediate gerotor element by the use of suitable porting. The porting arrangement disclosed herein, including slots 70 and ports 72 and 78, may be adapted to the inner gerotor element 40. With this arrangement, similar slots and similar porting and annular passages are provided in element 40, port plate 22 and housing section 14 positioned inwardly toward the center in the respective parts shown in the drawings; however, the port plate rotates at the same speed as element 40. Different types of porting systems may be used in the compound pump. For example, the type of system disclosed herein may be used in connection with the intermediate gerotor element, and the type of porting system disclosed in the aforementioned prior application may be used in connection with the inner gerotor element 40.

While a number of changes and modifications have been mentioned herein, other changes may be made without departing from the scope of the invention.

I claim:

1. A motor or pump device comprising a housing having fluid inlet and outlet passages, an internally toothed outer gerotor element, an externally toothed orbiting gerotor element, a shaft in said housing concentric with said outer gerotor element, a means connecting said orbiting element with said shaft including a gerotor element having external teeth of the same general shape as the external teeth of said orbiting gerotor element, a port means having holes arranged annularly at the side of said orbiting element and connected alternately to said fluid inlet and outlet passages, and radially extending passage means connecting the spaces along one peripheral half of said orbiting element with alternate ports in one-half of said annular hole arrangement, and radially extending passage means connecting the spaces along the other peripheral half of said orbiting element with the other alternate ports on the other half of said annular hole arrangement.

2. A motor or pump device as defined in claim 1 in which said port means includes a plate with the holes therein in juxtaposition to said orbiting element.

3. A motor or pump device as defined in claim 1 in which said holes are all located on the same side of said orbiting gerotor element.

4. A motor or pump device as defined in claim 1 in which the means connecting the spaces along one peripheral half of the orbiting element with one set of alternate holes consists of a plurality of equally spaced passages in said orbiting gerotor element terminating at the periphery of said element between the teeth thereon.

5. A motor or pump device as defined in claim 4 in which said holes are all located on the same side of said orbiting gerotor element.

6. A motor or pump device as defined in claim 5 in which said equally spaced passages consist of slots on the same side of said orbiting gerotor element as the annularly arranged holes.

7. A motor or pump device as defined in claim 2 in which the means connecting the spaces along one peripheral half of the orbiting element with one set of alternate holes consists of a plurality of equally spaced passages in said orbiting gerotor element terminating at the periphery of said element between the teeth thereon.

8. A motor or pump device as defined in claim 3 in which said equally spaced passages consist of slots on the same side of said orbiting gerotor element as the annularly arranged holes.

9. A motor or pump device as defined in claim 1, in which said means connecting said orbiting element with said shaft consists of a third gerotor element mounted on and rotatable with said shaft, teeth on the periphery of said third element, and teeth on the inner periphery of said orbiting element engaging the teeth on said third element.

10. A motor or pump device as defined in claim 7, in which said means connecting said orbiting element with said shaft consists of a third gerotor element mounted on and rotatable with said shaft, teeth on the periphery of said third element, and teeth on the inner periphery of said orbiting element engaging the teeth on said third element.

11. A motor or pump device as defined in claim 1 in which the port means includes a pair of annular grooves, one of said annular grooves communicating with said inlet passage and with one set of alternate holes, and the other annular groove communicating with said outlet passage and the other set of said alternate holes.

12. A motor or pump device as defined in claim 8 in which the port means includes a pair of annular grooves, one of said annular grooves communicating with said inlet passage and with one set of alternate holes, and the other annular groove communicating with said outlet passage and the other set of said alternate holes.

References Cited

UNITED STATES PATENTS

| | | | |
|---|---|---|---|
| 2,989,951 | 6/1961 | Charlson | 103—130 X |
| 3,106,163 | 10/1963 | Mosbacher | 103—130 X |
| 3,391,608 | 7/1968 | Huber | 91—56 |

EVERETTE A. POWELL, JR., Primary Examiner

U.S. Cl. X.R.

103—130